United States Patent
Ko et al.

(10) Patent No.: US 7,433,792 B2
(45) Date of Patent: Oct. 7, 2008

(54) DISC DRIVE TESTING SYSTEM AND METHOD

(75) Inventors: Yu-Cheng Ko, Guangdong (CN); Shuang-Quan Luo, Guangdong (CN)

(73) Assignees: Hong Fu Jin Precision Industry (Shen Zhen) Co., Ltd., Longhua Town, Bao'an District, Shenzhen. Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 154 days.

(21) Appl. No.: 11/309,450

(22) Filed: Aug. 8, 2006

(65) Prior Publication Data

US 2007/0168160 A1  Jul. 19, 2007

(30) Foreign Application Priority Data

Jan. 13, 2006 (CN) .................... 2006 1 0032961

(51) Int. Cl.
*G01R 27/28* (2006.01)

(52) U.S. Cl. .................... 702/117; 702/115; 702/118

(58) Field of Classification Search ................ 707/115, 707/117, 118
See application file for complete search history.

(56) References Cited

U.S. PATENT DOCUMENTS

| 4,563,712 A * | 1/1986 | Nishio et al. .................. 360/75 |
| 5,761,168 A | 6/1998 | Kwon |
| 5,867,506 A | 2/1999 | Lin |
| 6,098,026 A | 8/2000 | Lee |
| 6,985,317 B2 | 1/2006 | McConnell et al. |

* cited by examiner

*Primary Examiner*—John E. Barlow, Jr.
*Assistant Examiner*—Stephen J Cherry
(74) *Attorney, Agent, or Firm*—Winston Hsu

(57) ABSTRACT

A disc drive testing method is provided for testing a plurality of disc drives. The disc drive testing method includes steps of: selecting a disc drive as a current testing disc drive; sending load/unload commands to the current testing disc drive to drive the current testing disc drive to perform a load/unload operation; timing a load/unload duration of the current testing disc drive; and selecting a next disc drive as the current testing disc drive if the current testing disc drive is busy performing the load/unload operations. A related disc drive testing apparatus is also provided.

17 Claims, 2 Drawing Sheets

DISC DRIVE TESTING SYSTEM AND METHOD

FIELD OF THE INVENTION

This invention relates to disc drive testing systems and methods and, more particularly to a testing system and method for testing a load module of a disc drive.

DESCRIPTION OF RELATED ART

Discs are widely used for recording audio and/or video files due to their mass storage capabilities. Related disc drives are developed for recording information on or reproducing information from the discs. A general disc drive includes a housing for accommodating various components of the disc drive and a load module for carrying a disc to move into or out from the housing. The load module includes a disc tray for carrying the disc thereon and a driving unit for driving the disc tray to move back and forth relative to the housing. The disc tray is driven by the driving module to move out from the housing to an unload position, thereby allowing a user to place/replace a disc thereon or take a disc away therefrom.

Before the disc drive is put into the market by its manufacturer, it should pass specified tests. As one of essential components of the disc drive, the load module should be tested to satisfy specific requirements.

Therefore, a testing apparatus for testing the load module of the disc drive is desired.

SUMMARY OF THE INVENTION

A disc drive testing apparatus is provided for testing a plurality of disc drives. The disc drive testing apparatus includes a selecting unit, a command-sending unit, a timing unit, and a controlling unit. The selecting unit is used for selecting one of the disc drives as a current testing disc drive. The command-sending unit is used for sending a load/unload command to the current testing disc drive to drive the current testing disc drive to perform a load/unload operation. The timing unit is used for timing a load/unload duration of the current testing disc drive. The controlling unit is used for signaling the selecting unit to select a next disc drive as the current testing disc drive if the current testing disc drive is busy the load/unload operation.

A disc drive testing method is provided for testing a plurality of disc drives. The disc drive method comprising steps of: selecting a disc drive as a current testing disc drive; sending load/unload commands to the current testing disc drive to drive the current testing disc drive to perform a load/unload operation; timing a load/unload duration of the current testing disc drive; and selecting a next disc drive as the current testing disc drive if the current testing disc drive is busy performing the load/unload operation.

A storage medium is provided for recording a computer-executable program. The program includes selecting codes, sending codes, timing codes, and selecting codes. The selecting codes are used for selecting a disc drive as a current testing disc drive. The sending codes are used for sending load/unload commands to the current testing disc drive to drive the current testing disc drive to perform a load/unload operation. The timing codes are used for timing a load/unload duration of the current testing disc drive. The selecting codes are used for selecting a next disc drive as the current testing disc drive if the current testing disc drive is busy performing the load/unload operation.

Other advantages and novel features will become more apparent from the following detailed description of preferred embodiments when taken in conjunction with the accompanying drawings, in which:

BRIEF DESCRIPTION OF THE DRAWINGS

Many aspects of the disc drive testing apparatus and the disc drive testing method thereof can be better understood with reference to the following drawings. The components in the drawings are not necessarily to scale, the emphasis instead being placed upon clearly illustrating the principles of the present disc drive. Moreover, in the drawings, like reference numerals designate corresponding parts throughout the several views.

DETAILED DESCRIPTION OF THE INVENTION

Reference will now be made to the drawings to describe the preferred embodiment of the present disc drive testing apparatus and the present disc drive testing method, in detail.

In order to test a load module of a disc drive, a lot of parameters are used to evaluate the load module, these parameters including a load duration parameter and an unload duration parameter. The load duration is a time period from an instance when a disc tray starting at an unload position begins moving towards a housing of the disc drive to an instance when the disc tray reaches the housing of the disc and comes to a complete stop. The unload duration is a time period from an instance when the disc tray starting at a load position begins moving towards the unload position to an instance when the disc tray reaches the unload position and comes to a complete stop.

A general testing device is developed to test the load module. The testing device sends an unload command to instruct the disc drive to drive the disc tray to move out from the housing. From the instance when the disc tray begins moving out, a busy polarity of the disc drive is set to "busy", only until the disc tray reaches the unload position and comes to a complete stop that the busy polarity of the disc drive is set to "complete". The testing device starts recording the unload duration when the busy polarity of the disc drive is set to "busy", and stops recording the unload duration when the busy polarity of the disc drive is set to "complete". Similarly, when the disc tray begins moving towards the housing from the unload position, the busy polarity of the disc drive is set to "busy" and the testing device starts recording the load duration. When the disc tray reaches the load position and comes to a complete stop, the busy polarity of the disc drive is set to "complete".

When more than one disc drive needs to be tested, not tested disc drives have to wait until the testing device finishes testing a current testing disc drive before being tested. During the time period when the busy polarity of the disc drive is "busy", the testing device has to wait until the busy polarity of the disc drive is changed to "complete". However, testing in this manner is time-consuming. If the testing device is developed to test the not tested disc drives during the time period when the busy polarity of the disc drive is "busy", a testing efficiency will be greatly improved.

Figure 1:
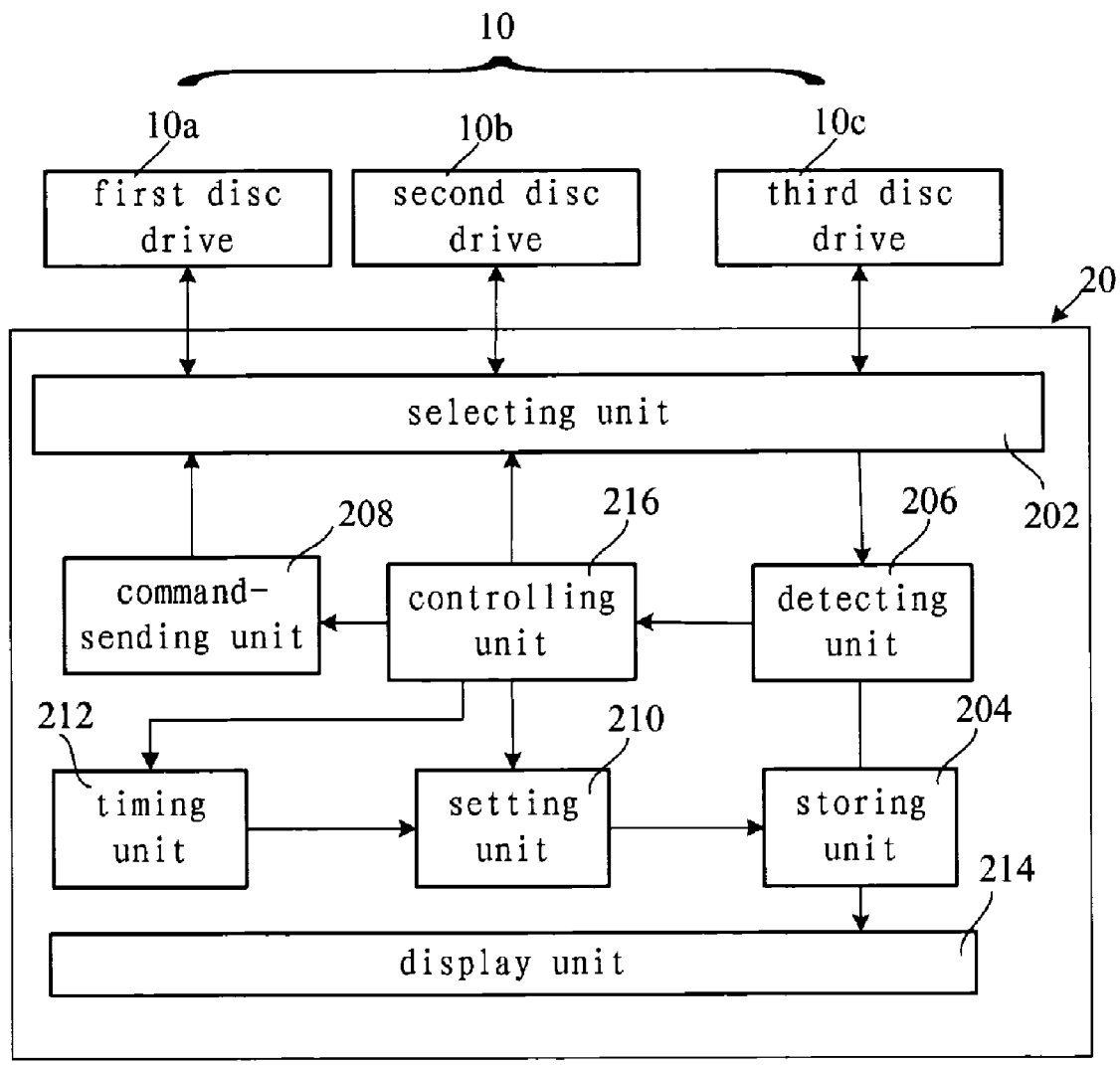
FIG. 1 is a block diagram of a disc drive testing apparatus in accordance with an exemplary embodiment.

Referring to FIG. 1, a disc drive testing apparatus 20 in accordance with an exemplary embodiment connects to multiple disc drives 10 to test load modules of the disc drives 10. Each disc drive 10 includes a disc tray and a busy polarity indicating whether the disc drive is busy load/unload. If the disc drive is at any position between the load position and the unload position, the busy polarity of the disc drive is set to "busy", otherwise, the busy polarity of the disc drive is set to "complete". The "busy" and "complete" of the busy polarity may be respectively identified as a low level and a high level.

The disc drive testing apparatus 20 includes a selecting unit 202, a storing unit 204, a detecting unit 206, a command-sending unit 208, a setting unit 210, a timing unit 212, a display unit 214, and a controlling unit 216.

The selecting unit 202 is used for selecting one of the disc drives 10 to serve as a current testing disc drive according to predetermined testing orders. For ease of description, hereinafter the number of the disc drives 10 is presumed to be 3. That is, the disc drives 10 includes a first disc drive 10a, a second disc drive 10b, and a third disc drive 10c. The predetermined testing order starts with 10a, 10b, 10c, and then loops back to 10a.

The storing unit 204 is used for storing information on the disc drives 10. Such information includes test count of each disc drives 10, states of each disc drives 10, load durations and unload durations of each disc drives 10. The states of each disc drives 10 includes a first state "load", a second state "unload", and a third state "idle". A default state of each disc drive 10 is set to the third state "idle". The state of the disc drive 10 is changed to the first state "unload" when the disc tray of the disc drive 10 begins moving out from the housing of the disc drive 10. Similarly, the state of the disc drive 10 is changed to "load" when the disc tray of the disc drive 10 begins moving towards the housing of the disc drive 10.

The detecting unit 206 is used for detecting the busy polarity of the disc drive 10, the information stored in the storing unit 204, and sending detected results to the controlling unit 216. The detected results include the busy polarity of the disc drive 10, the state of the disc drive 10, and the test count of the disc drive 10.

The command-sending unit 208 is used for sending load/unload commands to the current testing disc drive to drive the current testing disc drive to perform a load/unload operation.

The setting unit 210 is used for setting the test count of each disc drive 10 and updating the test count and the states of the disc drives 10. Before a testing procedure of the disc drives 10, each disc drive 10 is assigned a given test count. After every unload operation and load operation, the test count of the disc drive is decremented. When a total test count of the disc drives 10 is equal to 0, the testing procedure of the disc drives 10 is terminated.

The timing unit 212 is used for timing the load durations and the unload durations of the disc drives 10. When the busy polarity of the disc drive 10 is changed to "busy", the timing unit 212 begins timing, and when the busy polarity of the disc drive 10 is changed to "complete", the timing unit 212 stops timing.

The display unit 214 is used for displaying the load durations and the unload durations of the disc drives 10.

The controlling unit 216 is used for controlling working states of the selecting unit 202, the command-sending unit 208, the setting unit 210, and the timing unit 212. When the busy polarity of the current testing disc drive 10 is "busy", the controlling unit 216 signals the selecting unit 202 to select a next disc drive to serve as the current testing disc drive. The controlling unit 216 signals the command-sending unit 208 to send load commands when the state of the current testing disc drive is set to the second state "unload" and the busy polarity of the current testing disc drive is "complete". Similarly, the controlling unit 216 signals the command-sending unit 208 to send unload commands when the state of the current testing disc drive is set to the third state "idle". The controlling unit 216 signals the setting unit 210 to update the test count of the current testing disc drive 10 when the state of the current testing disc drive 10 is set to the third state "load" and the busy polarity of the disc drive 10 is "complete", and signals the setting unit 210 to update the states of the current testing disc drive 10 when the busy polarity of the current testing disc drive 10 is "complete".

Figure 2:
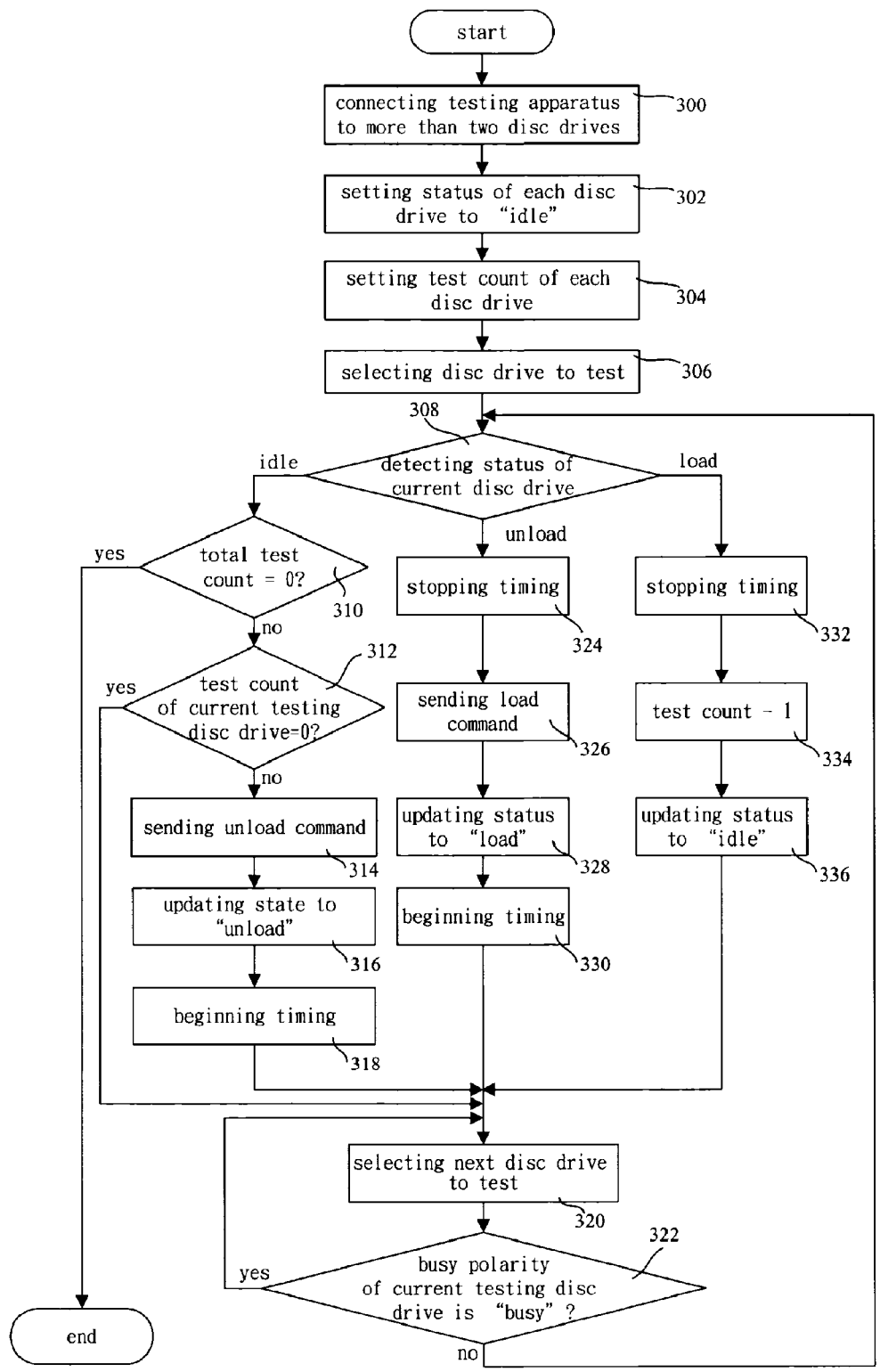
FIG. 2 is a flow chart illustrating a testing procedure of a disc drive testing method in accordance with an exemplary embodiment.

Referring to FIG. 2, a testing procedure of a disc drive testing method for testing the load modules of the disc drives 10 in accordance with an exemplary embodiment is illustrated.

First, in step 300, the disc drive testing apparatus 20 is connected to the disc drives 10.

Second, in step 302, the controlling unit 216 signals the setting unit 210 to set the state of each disc drive to the third state "idle".

Third, in step 304, the controlling unit 216 signals the setting unit 210 to set the test count of each disc drive. The test count assigned to each disc drive may be identical to or different from each other.

Fourth, in step 306, the controlling unit 216 signals the selecting unit 202 to select a disc drive (e.g. the first disc drive 10a) as the current testing disc drive.

Fifth, in step 308, the detecting unit 206 obtains the states of the current testing disc drive from the storing unit 204, and based on the states obtained the controlling unit 216 determines what state the current testing disc drive is at.

If in step 308, the state of the current testing disc drive is concluded to be "idle", another determination is made as to whether the total test count of the disc drives 10 is equal to 0 (step 310). If the total test count of the disc drives 10 is equal to 0, the testing procedure is terminated.

If in step 310, the total test count of the disc drives 10 is greater than 0, the testing procedure goes to step 312, where a further determination is made as to whether the test count of the current testing disc drive is equal to 0 (step 312).

If in step 312, the test count of the current testing disc drive is greater than 0, the testing procedure goes to step 314, where the command-sending unit 208 sends an unload command to the current testing disc drive. At the same time, the state of the current testing disc drive is updated to be "unload" by the setting unit 210 (step 316), and the timing unit 212 begins timing the unload duration of the current testing disc drive (step 318). Then the testing procedure proceeds to step 320, where the selecting unit 202 selects a next disc drive (e.g. the second disc drive 10b) as the current testing disc drive. If in step 312, the test count of the current testing disc drive is equal to 0, the testing procedure goes directly to step 320.

sequentially, in step 322, the detecting unit 206 detects the busy polarity of the current testing disc drive, and based on the busy polarity the controlling unit 216 determines whether the busy polarity of the current testing disc drive is "busy".

If in step 322, the busy polarity of the current testing disc drive is concluded to be "busy", the testing procedure goes back to step 320, where the selecting unit 202 selects a next disc drive (e.g. the third disc drive 10c) as the current testing disc drive.

If in step 322, the busy polarity of the current testing disc drive is concluded to be "complete", the testing procedure goes back to step 308.

If in step 308, the state of the current testing disc drive is concluded to be "unload", the controlling unit 216 signals the timing unit 212 to stop timing the unload duration, and the unload duration recorded by the timing unit 212 is stored into the storing unit 204 (step 324).

After step 324, the testing procedure proceeds to step 326, where the controlling unit 216 signals the command-sending unit 208 to send the load command to the current testing disc drive. At the same time, the state of the current testing disc drive is updated to be "load" by the setting unit 210 (step 328), and the timing unit 212 begins timing the load duration of the current testing disc drive (step 330). After that, the testing procedure proceeds to step 320.

If in step 308, the state of the current testing disc drive is concluded to be "load", the controlling unit 216 signals the timing unit 212 to stop timing, and the load duration recorded by the timing unit 212 is stored into the storing unit 204 (step 332).

Then, in step 334, the test count of the current testing disc drive is decremented by one, and the test count stored in the storing unit 204 is updated accordingly. At the same time, the status of the current testing disc drive is updated to be "idle" (step 336). After that, the testing procedure proceeds to step 320.

The disc drive testing apparatus 20 and the disc drive testing method uses the selecting unit 202 thereof to select a next disc drive to test if the busy polarity of the current testing disc drive is "busy". Thus, testing efficiency is greatly improved.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A disc drive testing apparatus for testing a plurality of disc drives, the disc drive testing apparatus comprising:
   a selecting unit for selecting one of the disc drives as a current testing disc drive;
   a command-sending unit for sending load/unload commands to the current testing disc drive to drive the current testing disc drive to perform load/unload operations;
   a timing unit for timing a load/unload duration of the current testing disc drive; and
   a controlling unit for signaling the selecting unit to select a next disc drive as the current testing disc drive if the current testing disc drive is busy performing load/unload operations.

2. The disc drive testing apparatus as claimed in claim 1, further comprising a detecting unit for detecting a busy polarity of the disc drive, the busy polarity of the disc drive indicating whether a load/unload operation is finished.

3. The disc drive testing apparatus as claimed in claim 1, wherein the timing unit begins timing when the disc drive starts performing the load/unload operation, and stops timing when the disc drive finishes the load/unload operation.

4. The disc drive testing apparatus as claimed in claim 1, further comprising a setting unit for setting states of the disc drives, the states indicating the load and the unload operations, and including an "unload" state indicating that the disc drive is performing the unload operation, a "load" state indicating that the disc drive is performing the load operation, and an "idle" state indicating that the disc drive is performing neither the load and the unload operations.

5. The disc drive testing apparatus as claimed in claim 4, wherein the unload command and the load command is sent by the command-sending unit based on the states of the current testing disc drive.

6. The disc drive testing apparatus as claimed in claim 4, further comprising a storage unit for storing the states of the disc drives.

7. A disc drive testing method for testing a plurality of disc drives, the disc drive method comprising steps of:
   selecting a disc drive as a current testing disc drive;
   sending load/unload commands to the current testing disc drive to drive the current testing disc drive to perform a load/unload operation;
   timing a load/unload duration of the current testing disc drive; and
   selecting a next disc drive as the current testing disc drive if the current testing disc drive is busy performing the load/unload operations.

8. The disc drive testing method as claimed in claim 7, further comprising a step of detecting a busy polarity of the current testing disc drive to determine whether the current testing disc drive finishes performing the load/unload operations.

9. The disc drive testing method as claimed in claim 8, further comprising a step of stopping timing the load/unload duration if the current testing disc drive finishes performing the load/unload operations.

10. The disc drive testing method as claimed in claim 7, further comprising a step of setting states of the disc drives, the states including an "unload" state indicating that the disc drive is performing the unload operation, a "load" state indicating that the disc drive is performing the load operation, and an "idle" state indicating that the disc drive is performing neither the load or the unload operation.

11. The disc drive testing method as claimed in claim 10, wherein the step of sending comprises a step of sending the unload command if the state of the current testing disc drive is "idle".

12. The disc drive testing method as claimed in claim 10, wherein the step of sending comprises a step of sending the load command if the state of the current testing disc drive is "unload" and the current testing disc drive finishes the unload operation.

13. The disc drive testing method as claimed in claim 10, further comprising a step of updating the state of the current testing disc drive from "idle" to "unload" if the disc drive begins performing the unload operation.

14. The disc drive testing method as claimed in claim 10, further comprising a step of updating the state of the current testing disc drive from "unload" to "load" if the disc drive begins performing the load operation.

15. The disc drive testing method as claimed in claim 10, further comprising a step of updating the state of the current testing disc drive from "load" to "idle" if the disc drive finishes performing the load operation.

16. A computer readable storage medium storing a computer-executable program, the program comprising:
   selecting codes for selecting a disc drive as a current testing disc drive;
   sending codes for sending load/unload commands to the current testing disc drive to drive the current testing disc drive to perform a load/unload operation;
   timing codes for timing a load/unload duration of the current testing disc drive; and
   selecting codes for selecting a next disc drive as the current testing disc drive if the current testing disc drive is busy performing the load/unload operation.

17. The computer readable storage medium as claimed in claim 16, further comprising detecting codes for detecting a busy polarity of the current testing disc drive to determine whether the current testing disc drive finishes performing the load/unload operation.

* * * * *